United States Patent
Schartner et al.

(10) Patent No.: US 12,275,100 B2
(45) Date of Patent: Apr. 15, 2025

(54) WELDING SYSTEM WITH ARC CONTROL

(71) Applicant: Illinois Tool Works Inc., Glenview, IL (US)

(72) Inventors: Quinn W. Schartner, Kaukauna, WI (US); James T. Olejniczak, Appleton, WI (US); Richard M. Hutchison, Iola, WI (US); Erik D. Miller, Verona, WI (US); Shuang Liu, Appleton, WI (US); Adam Anders, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/225,459

(22) Filed: Jul. 24, 2023

(65) Prior Publication Data

US 2024/0198444 A1    Jun. 20, 2024

Related U.S. Application Data

(63) Continuation of application No. 15/184,005, filed on Jun. 16, 2016, now abandoned, which is a continuation-in-part of application No. 14/743,405, filed on Jun. 18, 2015, now Pat. No. 10,562,123.

(51) Int. Cl.
| | | |
|---|---|---|
| *B23K 9/10* | (2006.01) | |
| *B23K 9/067* | (2006.01) | |
| *B23K 9/09* | (2006.01) | |
| *B23K 9/095* | (2006.01) | |

(52) U.S. Cl.
CPC .......... *B23K 9/1062* (2013.01); *B23K 9/0671* (2013.01); *B23K 9/095* (2013.01); *B23K 9/0953* (2013.01); *B23K 9/0956* (2013.01); *B23K 9/1043* (2013.01); *B23K 9/1056* (2013.01); *B23K 9/091* (2013.01)

(58) Field of Classification Search
CPC .... B23K 9/1043; B23K 9/095; B23K 9/0671; B23K 9/1062; B23K 9/0953; B23K 9/1056; B23K 9/0956; B23K 9/091
See application file for complete search history.

(56) References Cited

U.S. PATENT DOCUMENTS

| | | |
|---|---|---|
| 3,590,209 A | 6/1971 | Tatham |
| 3,657,724 A | 4/1972 | Feeley |
| 3,780,258 A | 12/1973 | Iceland |
| 4,166,941 A | 9/1979 | Cecil |

(Continued)

FOREIGN PATENT DOCUMENTS

| | | | |
|---|---|---|---|
| DE | 29924913 U1 * | 10/2006 | ......... B23K 37/0294 |
| EP | 1666183 | 6/2006 | |

(Continued)

OTHER PUBLICATIONS

Canadian Office Action Appln No. 2,986,442 dated Jun. 29, 2020.
Examiner Requisition Appln No. 2,986,442 dated Jul. 23, 2019.

*Primary Examiner* — Thien S Tran
(74) *Attorney, Agent, or Firm* — McAndrews, Held & Malloy, Ltd.

(57) ABSTRACT

A method and apparatus for controlling arc/short between a wire and a work piece is described. A current path parallel to the wire/work is provided. The voltage drop across the parallel path can be preset, to limit the wire/work voltage, or it can be controlled to a desired level. The control can be in response to feedback.

9 Claims, 14 Drawing Sheets

(56) References Cited

U.S. PATENT DOCUMENTS

| | | | |
|---|---|---|---|
| 4,310,744 A | 1/1982 | Okada | |
| 4,435,632 A | 3/1984 | Risberg | |
| 4,628,181 A * | 12/1986 | Pan | B23K 9/091 |
| | | | 219/130.33 |
| 5,001,326 A | 3/1991 | Stava | |
| 5,003,154 A | 3/1991 | Parks | |
| 5,513,093 A | 4/1996 | Corrigall | |
| 6,087,626 A | 7/2000 | Hutchison | |
| 6,784,806 B1 | 8/2004 | Lee, Jr. | |
| 9,233,432 B2 | 1/2016 | Zhang | |
| 9,463,523 B2 * | 10/2016 | Roth | B23K 9/124 |
| 10,065,258 B2 | 9/2018 | Ide | |
| 10,500,667 B2 | 12/2019 | Fujiwara | |
| 10,518,348 B2 | 12/2019 | Matsuoka | |
| 2003/0156435 A1 * | 8/2003 | Morimoto | H02M 1/38 |
| | | | 363/21.01 |
| 2005/0121430 A1 | 6/2005 | Samodell | |
| 2007/0051712 A1 | 3/2007 | Kooken | |
| 2007/0051714 A1 * | 3/2007 | Ou | B23K 9/1043 |
| | | | 219/130.21 |
| 2008/0190900 A1 | 8/2008 | Zhang | |
| 2008/0315778 A1 * | 12/2008 | Tatsukawa | H05B 45/38 |
| | | | 315/193 |
| 2009/0127242 A1 * | 5/2009 | Aimi | B23K 9/0953 |
| | | | 219/137 PS |
| 2010/0301030 A1 | 12/2010 | Zhang | |
| 2011/0248012 A1 * | 10/2011 | Fujiwara | B23K 9/1012 |
| | | | 219/136 |
| 2012/0319658 A1 * | 12/2012 | White | H02J 7/0047 |
| | | | 320/164 |
| 2013/0106402 A1 * | 5/2013 | Deboy | G01R 31/40 |
| | | | 324/140 R |
| 2014/0203004 A1 * | 7/2014 | Matsuoka | B23K 9/0956 |
| | | | 219/137 R |
| 2014/0293491 A1 * | 10/2014 | Robbins | H02H 7/00 |
| | | | 361/54 |
| 2014/0367365 A1 | 12/2014 | Zhang | |
| 2015/0053660 A1 * | 2/2015 | Schartner | B23K 9/1062 |
| | | | 219/130.1 |
| 2016/0278171 A1 * | 9/2016 | Jermyn | H05B 45/10 |

FOREIGN PATENT DOCUMENTS

| | | |
|---|---|---|
| EP | 1752248 | 2/2007 |
| RU | 2359796 C1 * | 6/2009 |
| RU | 2389590 C2 * | 5/2010 |

* cited by examiner

WELDING SYSTEM WITH ARC CONTROL

FIELD OF THE INVENTION

The present disclosure relates generally to the art of welding type systems. More specifically, it relates to welding type systems that provide arc control.

BACKGROUND OF THE INVENTION

Generally, electric arc welding entails providing current through a welding arc. The heat of the arc melts metal that fuses together. When welding with a wire feeder, the arc is formed between the tip of the wire and the workpiece. If the wire touches the workpiece a short circuit forms, and the arc is extinguished.

Some welding processes are performed best when there is not short circuits, others intentionally alternate between short circuits and arcs (short arc welding, e.g,), and others are performed best remaining in a short circuit (laser cladding welding, e.g.). Generally, short circuits result in less heating of the workpiece, but the transition from a short to an arc results in spatter.

The prior art has attempted to reduce spatter by reducing the current during, or just before, the transition from short to arc. Because the transition occurs quickly, simply commanding the current to a lower level can result in spatter because the current isn't lowered quickly enough due to system inductance and the system response time. Early attempts included changing the resistance using a switch in the current path. (See. e.g., U.S. Pat. No. 5,001,326). These attempts were largely unsuccessful because they still were not fast enough to reduce the current before the arc formed. A significant improvement was predicting when the arc would form, based on the rate of change of output power (dp/dt). This prediction provided enough advance time to overcome the lag time in the current command, thus the current was reduced before the arc formed. This greatly reduced spatter. The predictive technique is described in U.S. Pat. No. 6,087,626, which is hereby incorporated by reference. While the predictive control works well, it is a sophisticated control scheme, and not necessarily consistent with low cost welders.

Another improvement was using mechanical control of the wire to create the arc. The arc is formed when the wire is retracted (or the advance is slowed). Thus, the transition to the arc occurs at a known time and the current is lowered prior to that time. Alternatively, the current is lowered, and then the wire is retracted. Because the current is low when the arc is formed, spatter is reduced. This sort of system is described in U.S. Pat. No. 6,984,806, hereby incorporated by reference. While this system performs well it requires a wire feed motor close to the arc.

Also, the prior art is limited by the system response time. Whether the command is to change the current or to retract the wire it takes time for that command to be carried out. In the event of an unexpected arc, or an unexpected change in arc length, the response time for the wire to retract or the current to be reduced can be too long, resulting in spatter.

Welding processes that are best performed avoiding short circuits occasionally do have short circuits. It is desirable to transition back to an arc without excess spatter. The ways to control spatter in short circuit welding can be used in non-short circuit welding, but add to the cost and complexity. It is not practical to pay for the cost of a reversible wire feed for the occasional short circuit, in most arc welding applications. Likewise, it is often not practical to use the predictive control when shorts occur only occasionally.

Another welding process is laser cladding welding. Laser welding can be performed as a hybrid process where the laser provides the heat and wire is fed into the molten pool. The wire is preferably resistively preheated. A welding-type device can be used for this, where the output is intentionally short circuited to the workpiece (often called hot-wire applications). However, if an inadvertent arc forms, it can create spatter or cause too much iron to become part of the weld (by melting too much wire). Arcs can be avoided by lowering the output power, but the system response time limits the usefulness of this to avoid arcs and spatter.

In all three of the above processes (desired all arc and no short, desired repeated arc-short-arc-short transitions, and desired all short and no arc) it is desirable to control the arc and the arc formation in such a way as to avoid spatter and to maintain the desired state (whether it be arc or short). The control should be simple and fast, so that it can be used on a wide variety of type of welding type systems. Accordingly, a welding type system is desired that provides arc control, preferably by rapidly changing the current level in the arc, using simple and effective circuitry

SUMMARY OF THE PRESENT INVENTION

According to a first aspect of the disclosure a welding-type system includes a power circuit, an arc clamp module, and a controller. The power circuit is connected to provide welding-type power on a first electrode and a second electrode, and the power circuit has at least one control input. The arc clamp module is electrically coupled to the first electrode and the second electrode. The controller has a power circuit control output that is connected to the control input on the power circuit.

Welding-type system, as used herein, includes any device capable of supplying welding type power, including ancillary devices such as a wire feeder, robot, etc. A welding-type power supply can be located within a single housing or distributed amongst multiple housings. Welding-type power, as used herein, refers to welding, plasma, induction heating power, or hot wire welding/preheating (including laser welding).

According to a second aspect of the disclosure a method or controlling welding-type power includes providing welding-type power on a first electrode and a second electrode. There is a working current path is between the first electrode and the second electrode. At least one of current through or voltage across the working current path is controlled by providing a bypass current path that is in parallel with the working current path. Working current, as used herein, refers to the arc, resistive or process current that is used to heat (or otherwise perform a desired function). Bypass current, as used herein, refers to current shunted from the working current path that is used to control or suppress the arc. Output current, as used herein, is the current provided by the power circuit, and includes the working current and the bypass current.

Arc clamp module, as used herein, refers to a module that limits the output voltage of a welding-type power supply by providing a current path alternative to the arc so that an arc is extinguished, prevented from forming, or controlled. An arc clamp module can be passive, wherein it operates without control, or active, wherein it operates in response to one or more control signals. Controller, as used herein, refers to digital and analog circuitry, discrete or integrated circuitry, microprocessors, DSPs, etc., and software, hardware and firmware, located on one or more boards, used to control a device or module such as a power circuit or arc clamp module. Electrically connected, as used herein, means an electric signal can pass between two or more components, either directly or through intermediate components.

The arc clamp module is passive in one embodiment, and is an active arc clamp module in another embodiment. The active arc clamp modules have an arc clamp control input, and the controller has an arc clamp control module with an arc clamp control output connected to the arc clamp control input.

A feedback circuit connected to one or both of the electrodes and/or to the arc clamp module, provides feedback to the controller, and the controller controls the arc clamp control output in response thereto in another alternative.

The feedback circuit includes a current and/or voltage sensor and the arc clamp module is controlled in response to current and/or voltage in various embodiments. Controlling in response to current, as used herein, includes controlling in response to functions thereof and controlling in response to voltage, as used herein, includes controlling in response to functions thereof.

The arc clamp control module is at least partially implemented using hardware and/or at least partially implemented using software in various embodiments.

The welding-type system includes a wire feeder connected to the first electrode in one embodiment.

The arc clamp module is electrically coupled to an output of the wire feeder and/or an input of the wire feeder in various embodiments.

The arc clamp module includes a TVS and/or a plurality of diodes, arranged such that the voltage drop across the arc clamp module limits the current in the arc at a desired voltage across the arc clamp module in one embodiment. TVS, or transient voltage suppressor, as used herein, includes modules or devices that are designed to react to sudden or momentary over voltage conditions.

The arc clamp module includes a plurality of diodes and a plurality of voltage taps, with each tap between at least two of the plurality of diodes, and with each tap also electrically connectable (such as by a switch) to the second electrode in another embodiment.

The arc clamp module includes at least one transistor that controls the voltage across the arc clamp module in one embodiment.

Other principal features and advantages of will become apparent to those skilled in the art upon review of the following drawings, the detailed description and the appended claims.

Figure 1:
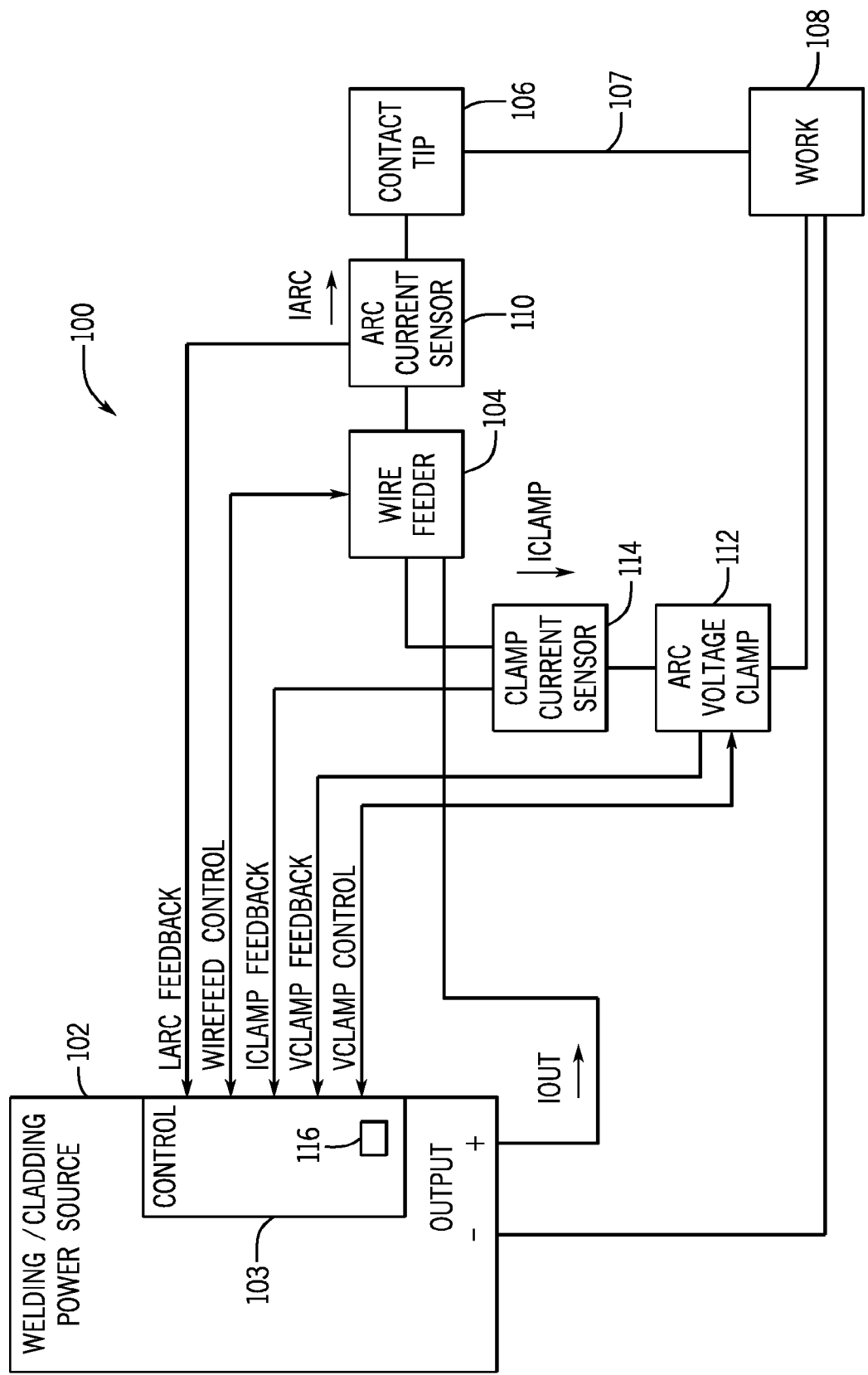
FIG. 1 is a circuit diagram of a welding-type power supply.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular circuits and control schemes used in particular welding type systems performing particular welding type processes, it should be understood at the outset that the invention can also be implemented with other welding type systems and other circuitry and control schemes, and to perform other welding type processes.

Embodiments of the present invention will be described in the context of laser welding, and in the context of short circuit and pulse welding. Laser welding (or hot wire) is performed with the welding wire short circuited to the workpiece. The welding power supply preheats the wire and the laser provides the energy to melt the wire. Because the welding power supply is used only for preheating, arcs are typically avoided.

Generally, the embodiment of the invention described with respect to laser welding uses a typical welding-type power supply used in a typical fashion for laser welding, with the addition of an arc suppression circuit in parallel with the wire/work current path. The embodiment of the invention described with respect to short circuit and pulse welding uses a typical welding-type power supply used in a typical fashion, with the addition of an arc control circuit in parallel with the wire/work current path. Both the arc suppression circuit and the arc control circuit are arc clamp modules.

Welding-type power supply, as used herein, includes any device capable of supplying welding, plasma cutting, and/or induction heating power, as well as control circuitry and other ancillary circuitry and devices such as a wire feeder associated therewith. A welding-type power supply can be located within a single housing or distributed amongst multiple housings.

The output of the welding-type power supply is provided to the welding wire and short circuit, and the arc suppression circuit includes an alternative current path for the output current. When an arc begins to form the output voltage rises, and the alternative current path clamps the voltage to level that prevents the arc from forming (or controls the arc). One embodiment provides for a passive clamping circuit, and another provides for a controlled current path. Preferably, in either case, the controller for the output is commanded to reduce the output. The clamp can quickly suppress the arc during the time it takes for the output to respond to the command. After the output has been reduced, the clamp becomes inactive until the next time it is needed.

Referring now to FIG. 1, a welding-type power supply 100 includes a power circuit 102, a wire feeder 104, a contact tip 106, an arc current sensor 110, an arc clamp module 112 and a clamp current sensor 114 that cooperate to preheat a welding wire 107 that is used in laser welding on work piece 108. Welding power circuit 102 may operate as a prior art welding power circuit, and is preferable implemented using a Miller Auto-Axcess® or Axcess® welding power supply. Wire feeder 104 receives power from power circuit 102, and is preferably implemented using a Miller Axcess Wire Feeder®.

Arc clamp module 112 is provided to clamp the output and prevent arcs from forming between wire 107 and workpiece 108 (in hot wire applications). Arc clamp module 112 provides an alternative output current path in parallel with wire cladding 107. The parallel current path shunts current from wire cladding 107 (or welding wire 107 in an arc welding process) and provides control of the power available to the process.

Arc clamp module 112 is shown as an external module in FIG. 1, but can be integral to power circuit 102 and/or wire feeder 104. Arc clamp module 112 is preferably located such that the loop formed by the parallel current paths is minimized to reduce the circuit inductance, thus allowing current to transition between the two paths with minimal delay. In many welding applications, the power source and wire feeder are packaged in separate boxes allowing the power source to be remotely located away from the work area, and the wire feed drive assembly is also located remote from the local user interface, in some applications. In such cases, the output weld cables between the power source and wire feeder add to the total output inductance in the output circuit. Connecting arc clamp module 112 across the contact tip, with a separate work lead connection keeps the loop as short as possible. However, in practice, it is might be easier to terminate one side of the arc clamp module 112 at wire feeder 104. It might also be convenient to terminate the arc clamp module 112 to the work at power circuit 102.

Arc clamp module 112 can be an active module, where the output current or voltage is sensed and the alternative current path is opened in response to the sensing, or it can be passive, such as implemented by a series of diodes (described more fully below). Arc clamp module 112 is shown in FIG. 1 as being actively controlled, and arc current sensor 110 and/or a clamp current sensor 114 provide feedback to an arc clamp control module arc clamp control module 116 that is part of a welding-type power supply controller 103. Arc clamp control module 116 is shown integral to system controller 103, but it can be distributed and/or located in wire feeder 104, in an external module, or a combination thereof.

System 100 includes three main current paths: arc clamp module 112; the arc/short wire-workpiece, and the output of power circuit 102. Prior art welding-type power supplies typically have an output current sensor integral to power circuit 102 (or wire feeder 104) source which measures the total output current. Thus, clamp current sensor 114 measures the current in the arc clamp module 112, and arc current sensor 110 measures the current in the arc/short circuit. Preferably, the number of current sensors in the system is minimized without compromising critical performance attributes. Therefore, alternate current sensing arrangements are possible for the clamp and arc current sensing. For example, the clamp circuit current could be mathematically derived as the difference between a sensed total output current and a sensed arc current. Similarly, the arc current could be mathematically derived as the difference between a sensed total output current and a sensed clamp current.

In operation arc clamp module 112 controls the voltage across the arc and/or controls the current through the arc by providing an alternative current path. The control can be to prevent the voltage or current from rising above a given magnitude, or to control it based on I/V feedback, to maintain an arc or short state between wire 107 and work 108 as desired.

Alternatives include connecting arc clamp module 112 to power circuit 102, to the output of wire feeder 104, to a node within wire feeder 104, or at or closer to contact tip 106. Also, clamp current sensor 114 could be located between arc clamp module 112 and work 108.

The above arrangements can be used to implement alternatives that prevent arcs, or control transitions, depending on the implementation of arc clamp module 112 and arc clamp control module 116. Various embodiments of arc clamp module 112 are shown in FIGS. 2-9. Each could be arranged in the location shown in FIG. 1, or any other location where an alternative current path to the wire/work current path.

Figure 2:
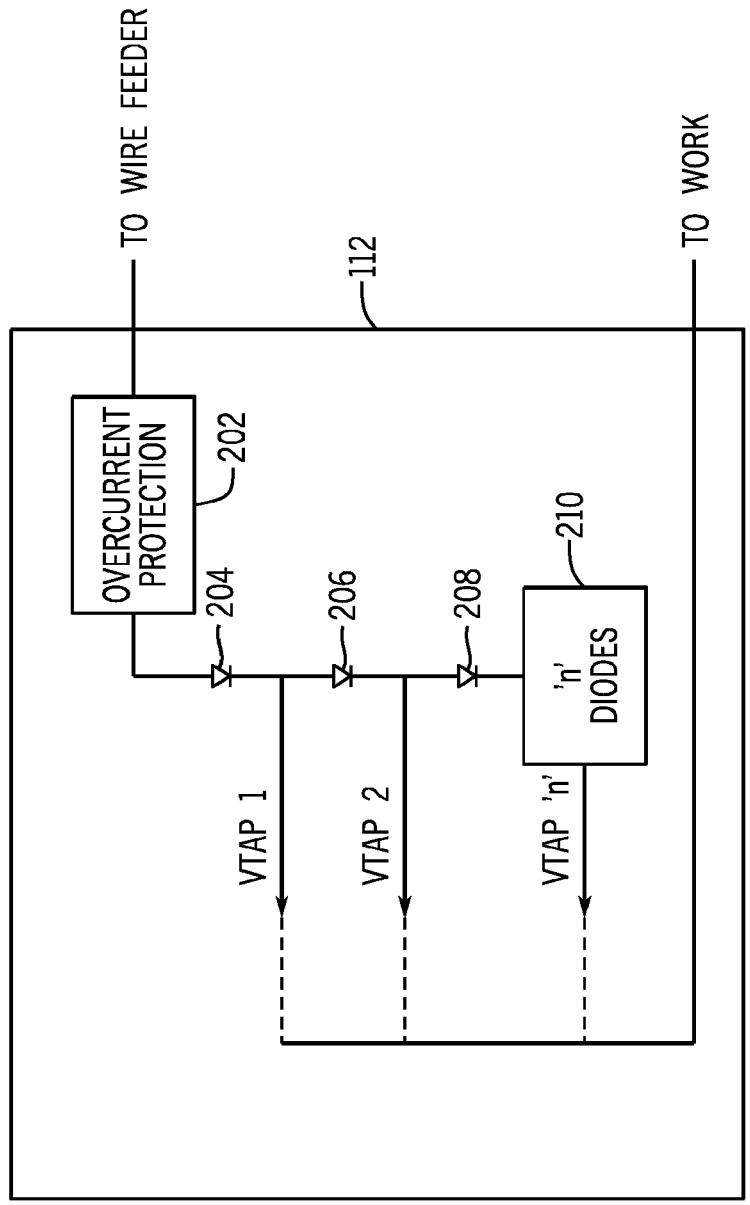
FIG. 2 is a circuit diagram of an arc clamp module.

An embodiment of arc clamp module 112 that is passive is shown in FIG. 2, and includes an overcorrect protection circuit 202, diodes 204-208, "n" diodes 210. A voltage tap exists between each of diodes 204-208 and each of the "n" diodes. The operation will be described with respect to diodes 204-208, and operates in a similar manner with the "n" diodes shown as a block, where "n" is chosen to give the desired clamp magnitude.

Diodes 204-208 are in series (but for the voltage taps) and form a passive arc clamp. Diodes 204-208 do not conduct current when the circuit voltage is below the total forward voltage drop of the series diode connection. Conversely, the diodes begin to conduct current when the circuit voltage exceeds the total forward voltage drop. Because diodes 204-208 current conduction is independent of any additional controls, this embodiment is a passive arc clamp module.

One embodiment of the invention is using arc clamp module 112 as an add-on to an existing welding-type power supply, and because diodes 204-208 conduct current from anode to cathode, arc clamp module 112 should be connected to the weld or cladding circuit in the proper polarity for the circuit to function. Alternatively, a parallel branch of series diodes could be added that conduct in the opposite polarity, thereby making connection of arc clamp module 112 polarity insensitive.

Each diode has a forward drop Vf. Preferably, all of the diodes in series are the same size or rating so Vf is similar for each diode, and the arc clamp module 112 set point can be more easily predicted. The total number of diodes sets the maximum clamp voltage at zero current to n*Vf. As current increases in the diodes, the voltage drop across the Arc Voltage Clamp can be approximated by the following equation: $Vclamp = n*Vf + Iclamp*Rd$, where Rd is a the slope resistance of the diode.

The clamp set point can adjusted to clamp at a lower voltage by manually connecting the work to one of several tap connections between the diodes, as shown. Alternatives include providing one set point, or set points for less than between every diode pair (a tap after every other diode, e.g.). This embodiment of arc clamp module 112 is particularly well suited for hot-wire laser cladding systems.

Overcorrect protection 202 is an optional means to protect the diodes from failure due to thermal overstress condition, and can be implemented using fuses, thermistors, etc.

Figure 3:
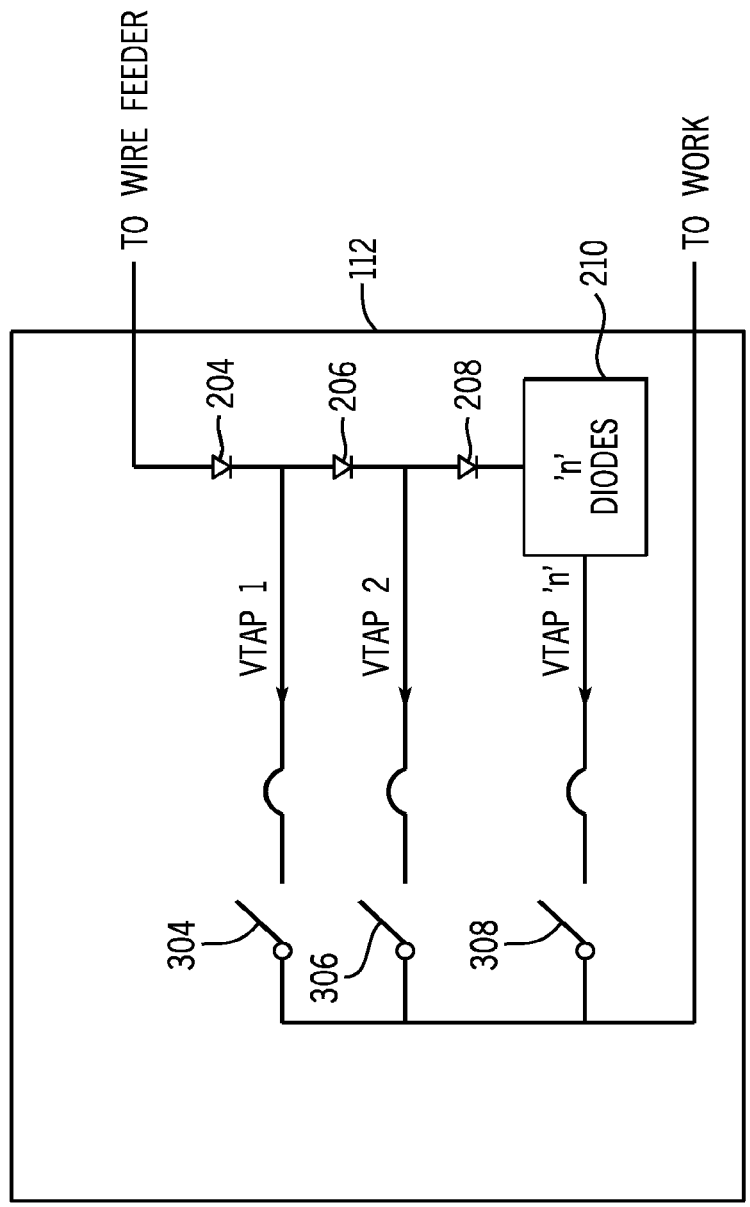
FIG. 3 is a circuit diagram of an arc clamp module.

FIG. 3 is an embodiment of arc clamp module 112 where the voltage taps therein are implemented with manual switches 304-308. Switches 304-308 can be set by the user, either on the system front panel, by an input on arc clamp module 112, or other means. This embodiment operates in a manner similar to the embodiment of FIG. 2, but does not require a tool to change the clamp voltage set point. This embodiment is suitable for hot-wire cladding system. Overcorrect protection is shown as combined with switch, and could be implemented using fuses or circuit breakers, or could be omitted.

Figure 4:
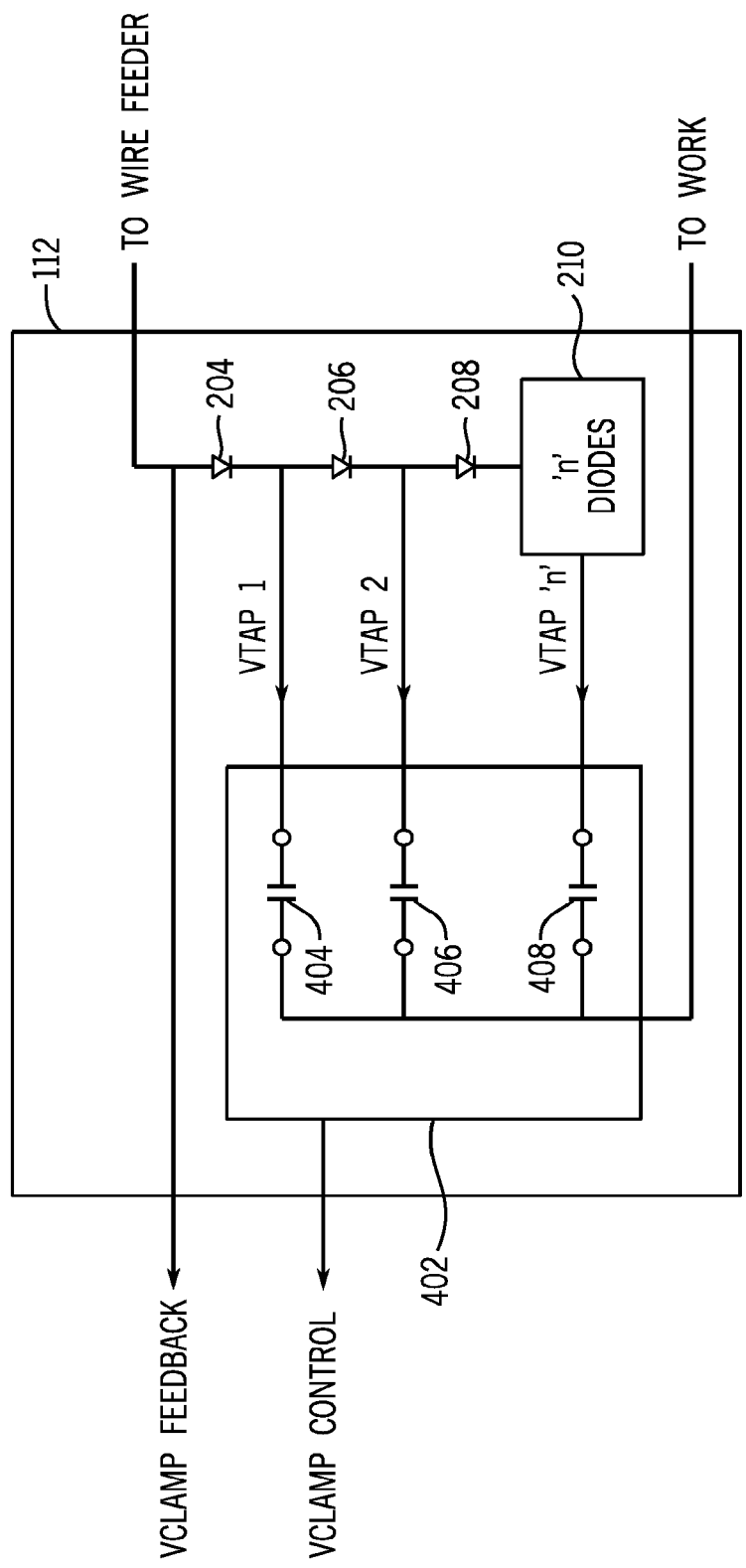
FIG. 4 is a circuit diagram of an arc clamp module.

FIG. 4 is an embodiment of arc clamp module 112 where the voltage taps therein are implemented with relays 404-408. Electromechanical devices 404-408 can be automatically controlled by the controller arc clamp control module 116 based on the application or program selected by the user. This embodiment is suitable for hot-wire cladding. Automatic control of the wire/work voltage set by arc clamp module 112 is implemented with hardware, software, or both. The control logic to switch the set point could be based on user input, built in program and application data, current and voltage feedback, temperature feedback, or combination thereof. Overcorrect protection is not shown in this embodiment, although it could be added (and it could be added or omitted from any embodiment). When overcorrect protection is not used with this embodiment current through arc clamp module 112 can be interrupted by automatic switching of relays 404-408, effectively disabling the clamp. Control logic to disable the clamp circuit could be based on clamp current feedback, clamp temperature feedback, duty cycle or a combination thereof.

Figure 5:
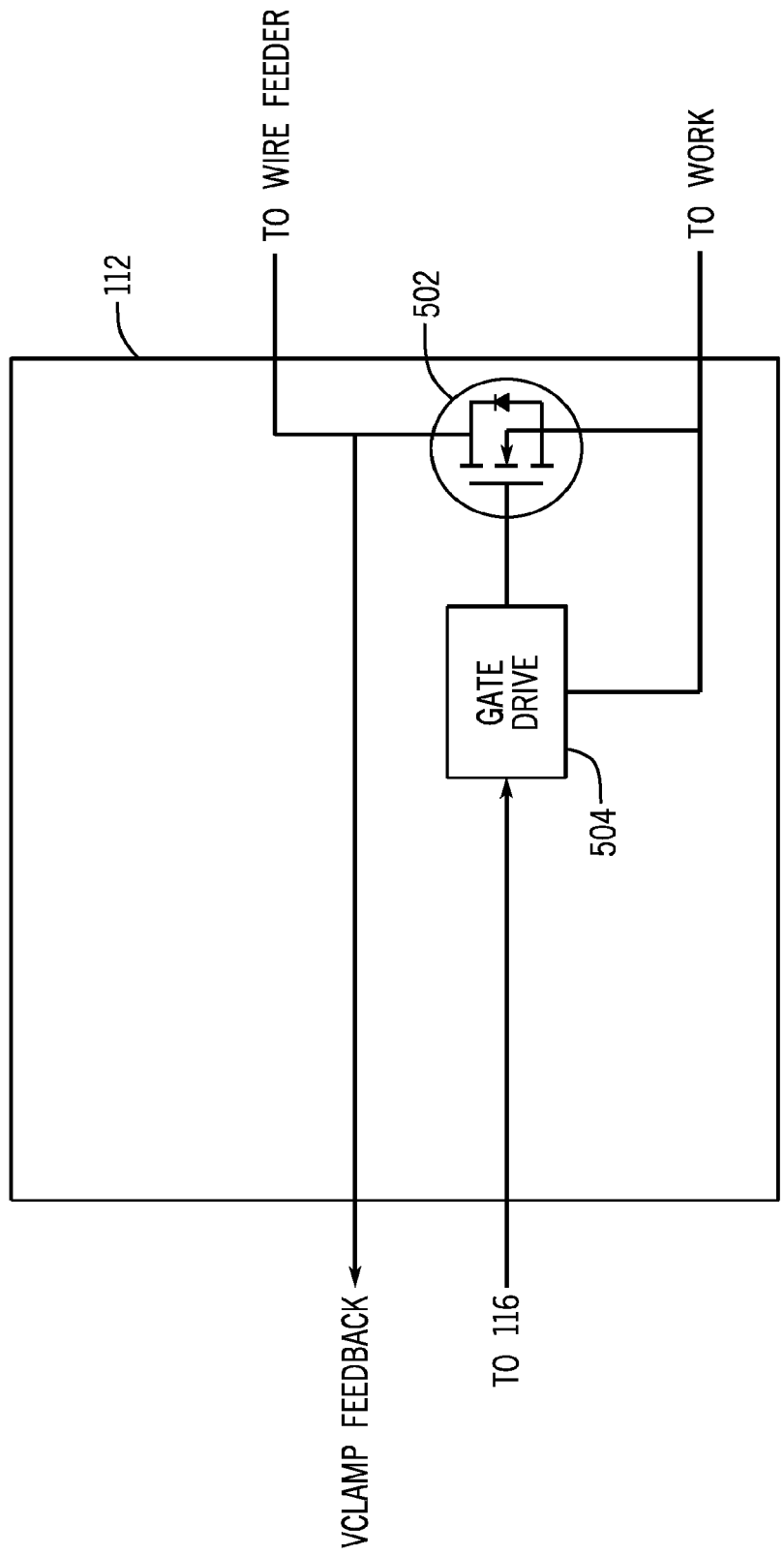
FIG. 5 is a circuit diagram of an arc clamp module.

FIG. 5 is a circuit diagram of an embodiment of arc clamp module 112 including a transistor 502, a gate drive circuit 504, and includes clamp (or wire/work) voltage feedback. Transistor 502 shunts a percentage of the arc current into arc clamp module 112 when a desired clamp voltage is reached. This embodiment can effectively operate as a programmable zener diode. Closed loop control (using the V feedback) can be implemented to achieve the desired clamp voltage. An error signal can be derived from the actual clamp voltage (Vclamp feedback) and the target clamp voltage (Vref), such that as Vclamp feedback exceeds Vref the error signal drives a gate voltage increase. Conversely, as Vclamp feedback falls below Vref the error signal drives a gate voltage decrease. In this way, the control system uses gate voltage to operate the transistor in a linear region to shunt more or less current in the Arc Voltage Clamp thereby achieving the desired clamp voltage. This embodiment could be used in hot-wire cladding systems and arc welding systems. It offers the benefit of using closed loop control to regulate the clamp voltage, with the ability to adjust the target clamp voltage to the optimum value for a given application. Transistor 502 should be sized to dissipate large amounts of power as it conducts current at the clamp voltage. Alternatively, more transistors could be combined in parallel to reduce the component size and spread the heat dissipation. Closed loop control of the voltage across arc clamp module 112 could be implemented with hardware, software, or a combination thereof. Control logic to adjust the clamp voltage set point could be based on user input, built in program and application data, current and voltage feedback, temperature feedback, or a combination thereof. The clamp voltage set point could also be dynamically adjusted in response to user input, sensor feedback, or combination thereof. Overcorrect protection is not shown (but could be added) because current through arc clamp module 112 can be interrupted by turning the transistor off. Control logic to turn off the transistor could be based on clamp current feedback, clamp temperature feedback, duty cycle or a combination thereof.

Figure 6:
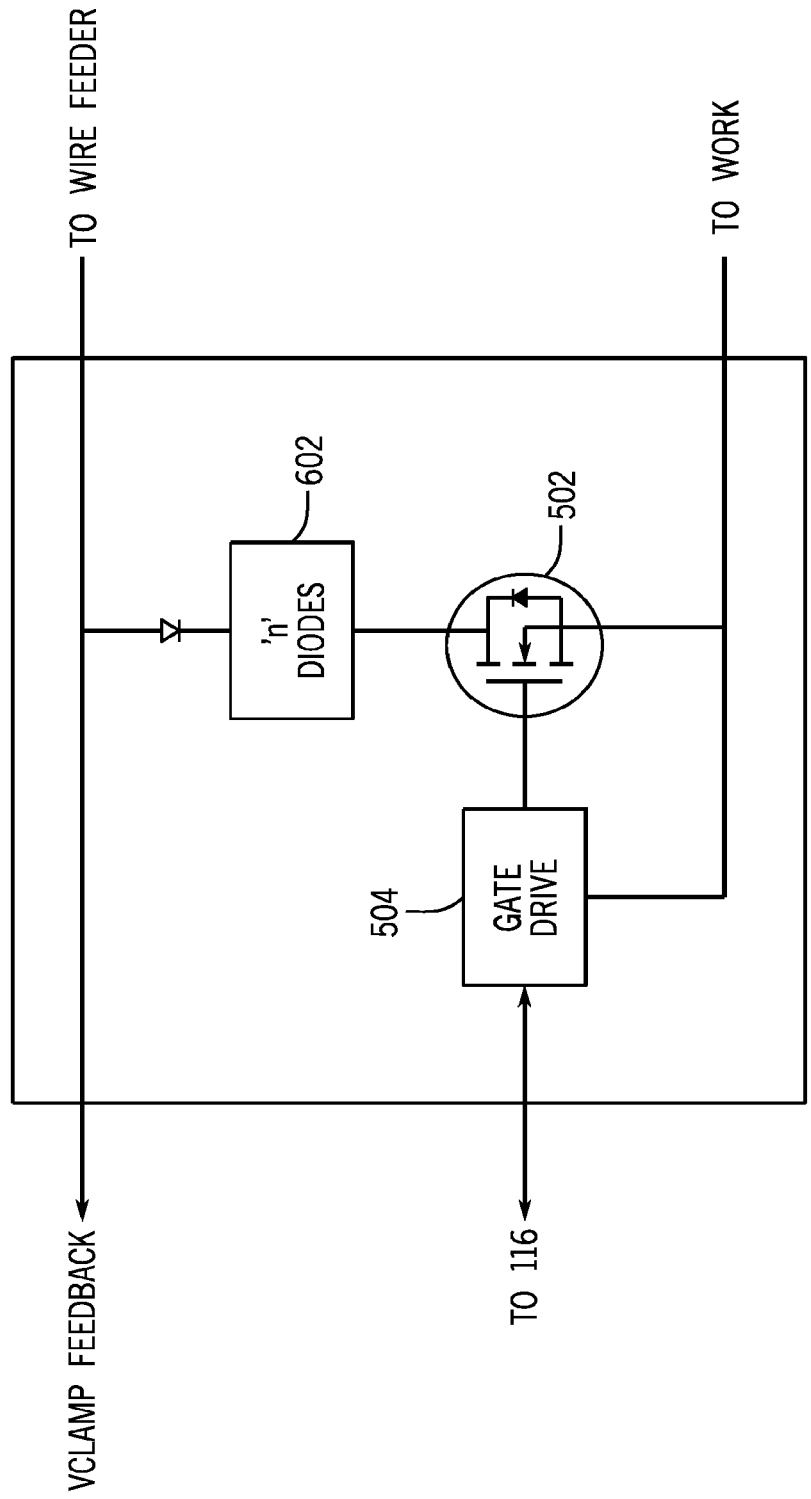
FIG. 6 is a circuit diagram of an arc clamp module.

FIG. 6 is a circuit diagram of an embodiment of arc clamp module 112 similar to FIG. 5, including transistor 502, gate drive circuit 504, clamp (or wire/work) voltage feedback, along with a diode block 602. Operation is similar to the embodiment of FIG. 5, and uses closed loop control and gate voltage of transistor 502 to regulate the voltage and current in arc clamp module 112. However, the clamp voltage drop and total power dissipation is now spread across diodes 602 and transistor 502, with a smaller percentage of the total clamp voltage falling across the transistor. This should provide advantages in thermal management and control. Additional transistors can be added at different tap connections to provide a desired range of operation and control resolution for a wide variety of applications and power levels. This embodiment is suitable for both hot-wire cladding systems and arc welding systems. It offers the benefit of using closed loop control to regulate the clamp voltage, with the ability to adjust the target clamp voltage to the optimum value for a given application. The clamp voltage set point can be dynamically adjusted as described above.

When arc clamp module 112 is used in arc welding applications it can help improve starts. During an arc strike, the clamp can initially be disabled with the transistor off. Upon current and/or voltage threshold detection, the clamp could be enabled and used to control the energy available to the welding arc as the arc is initiated.

Similarly, arc clamp module 112 could be enabled periodically during the process to control the arc energy available following a short circuit, similar to or as an improvement to controlled short circuit welding processes like RMD, STT and CMT. Arc clamp module 112 is controlled such that the arc current and voltage are regulated to set point values for a desired period of time following a short circuit event, as the arc re-ignites. By controlling the power in the short circuit, spatter is reduced as the process transitions to an arc state. The output command can be the same as systems without arc clamp module 112, wherein module 112 acts until the output responds to the command, and module 112 is no longer needed to control the output. Alternatively, the output command can be controlled using a scheme specifically designed to take advantage of the very fast response of the arc clamp module 112.

Arc clamp module 112 can help respond to inadvertent short circuits in MIG, spray, hybrid pulse/short welding, and other processes where undesired shorts occur. By diverting power from the wire/work when a short forms or is about to clear, spatter can be reduced.

Figure 7:
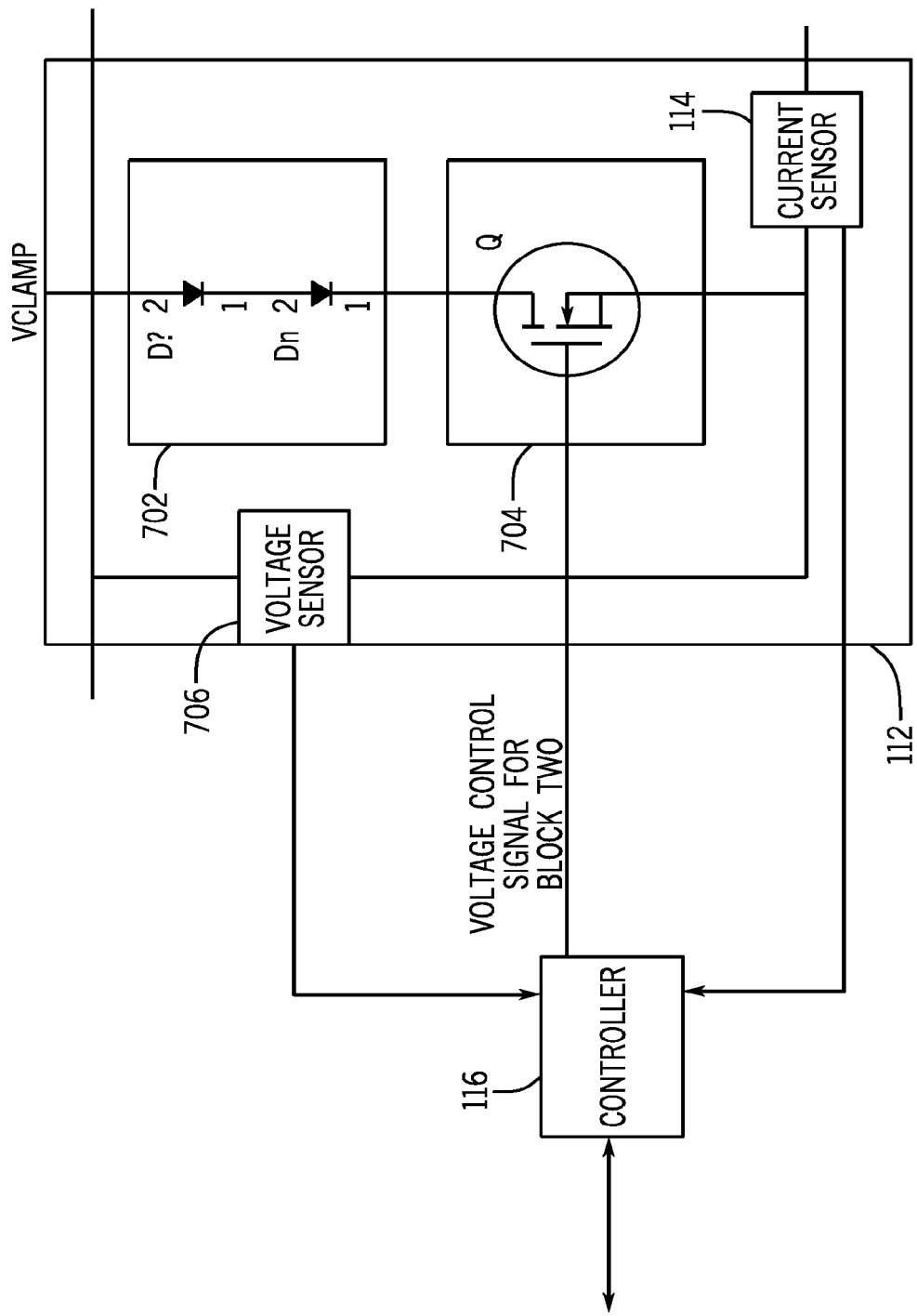
FIG. 7 is a circuit diagram of an arc clamp module.

FIG. 7 is a circuit diagram of an active arc clamp module 112 similar to that of FIG. 6, and includes diode block 702, switch 704, current sensor 114 and a voltage sensor 706. Diode block 702 includes "n" diodes, where "n" is chosen based on the smallest desired voltage a cross arc clamp module 112. Switch 704 can be used to enable or disable arc clamp module 112 on and off, or to control the voltage drop across arc clamp module 112 in response to sensed voltage. When switch 704 is used to control the voltage across arc clamp module 112 (and thus the wire/work voltage, it is preferably implemented using one or more transistors operated in the linear range.

Figure 8:
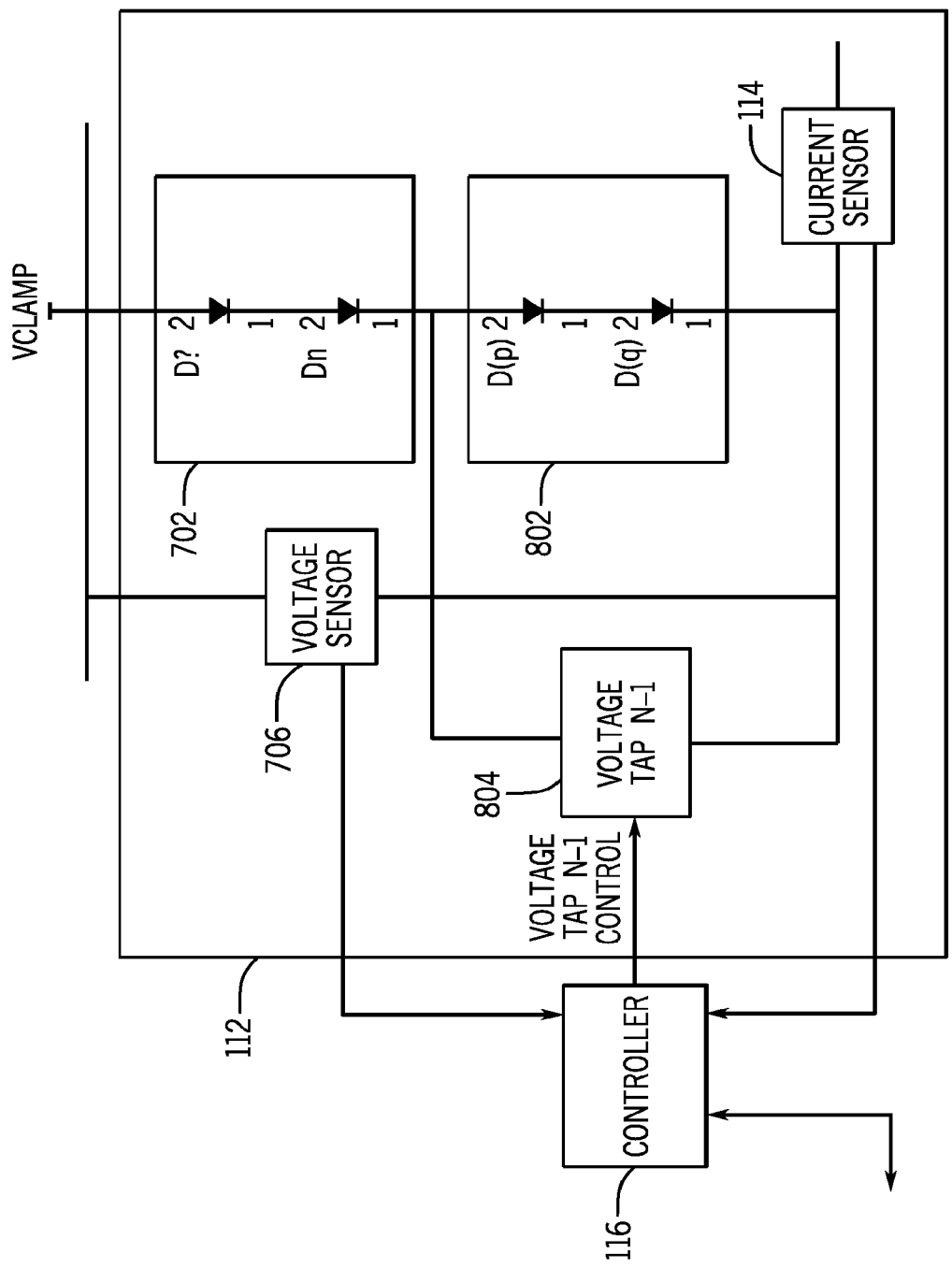
FIG. 8 is a circuit diagram of an arc clamp module.

FIG. 8 is a circuit diagram of another embodiment of arc clamp module 112, which includes diode block 702, a diode block 802, current sensor 114 voltage sensor 706, and a plurality of taps 804, and operates in a manner similar to the embodiment of FIG. 2. However, in this embodiment diode block 702 sets the minimum wire/work clamp voltage, and diode block 704 along with taps 804 control the actual clamp voltage. The tap used can be user set, such as on the front panel, or can be set by controller arc clamp control module 116 based on feedback form the process. When it is set by controller 116 switches such as IGBTs or transistors can enable or disable taps.

Figure 9:
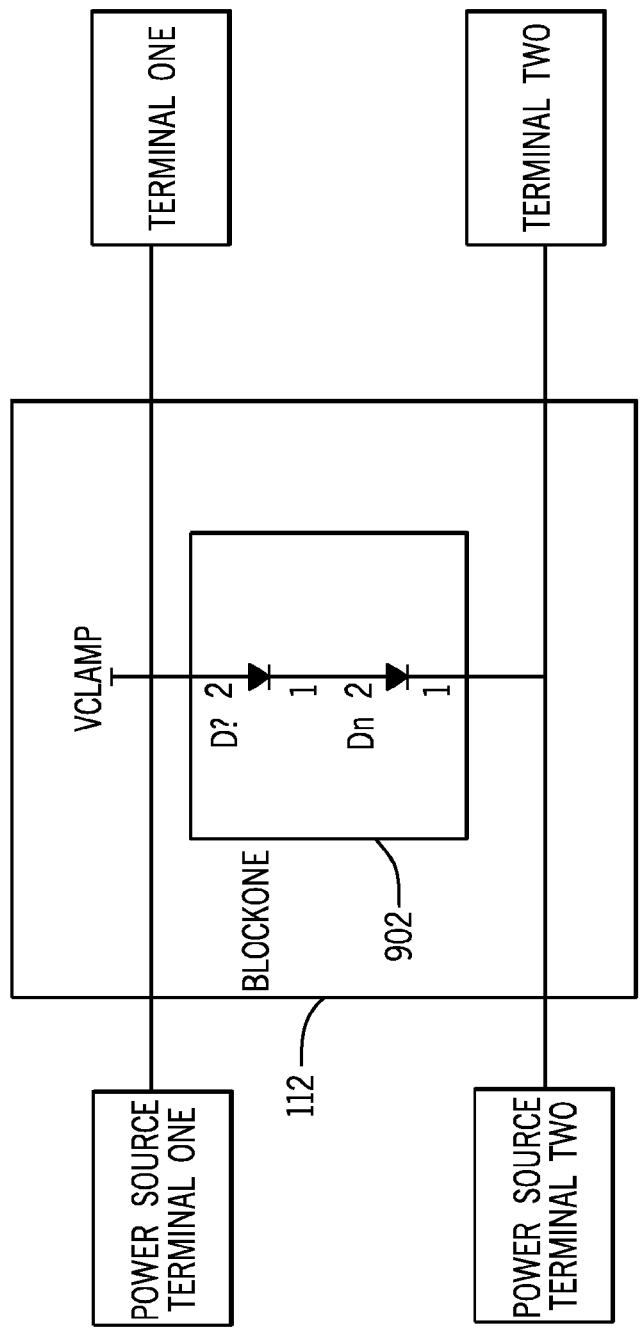
FIG. 9 is a circuit diagram of an arc clamp module.

FIG. 9 is a circuit diagram of an embodiment of a passive arc clamp module 112, and includes diode block 702, and operates in a manner similar to the embodiment of FIG. 2. However, in this embodiment diode block 702 sets the wire/work clamp voltage, and there are no taps. The number of diodes is chosen to give the desired clamp voltage.

Figure 10:
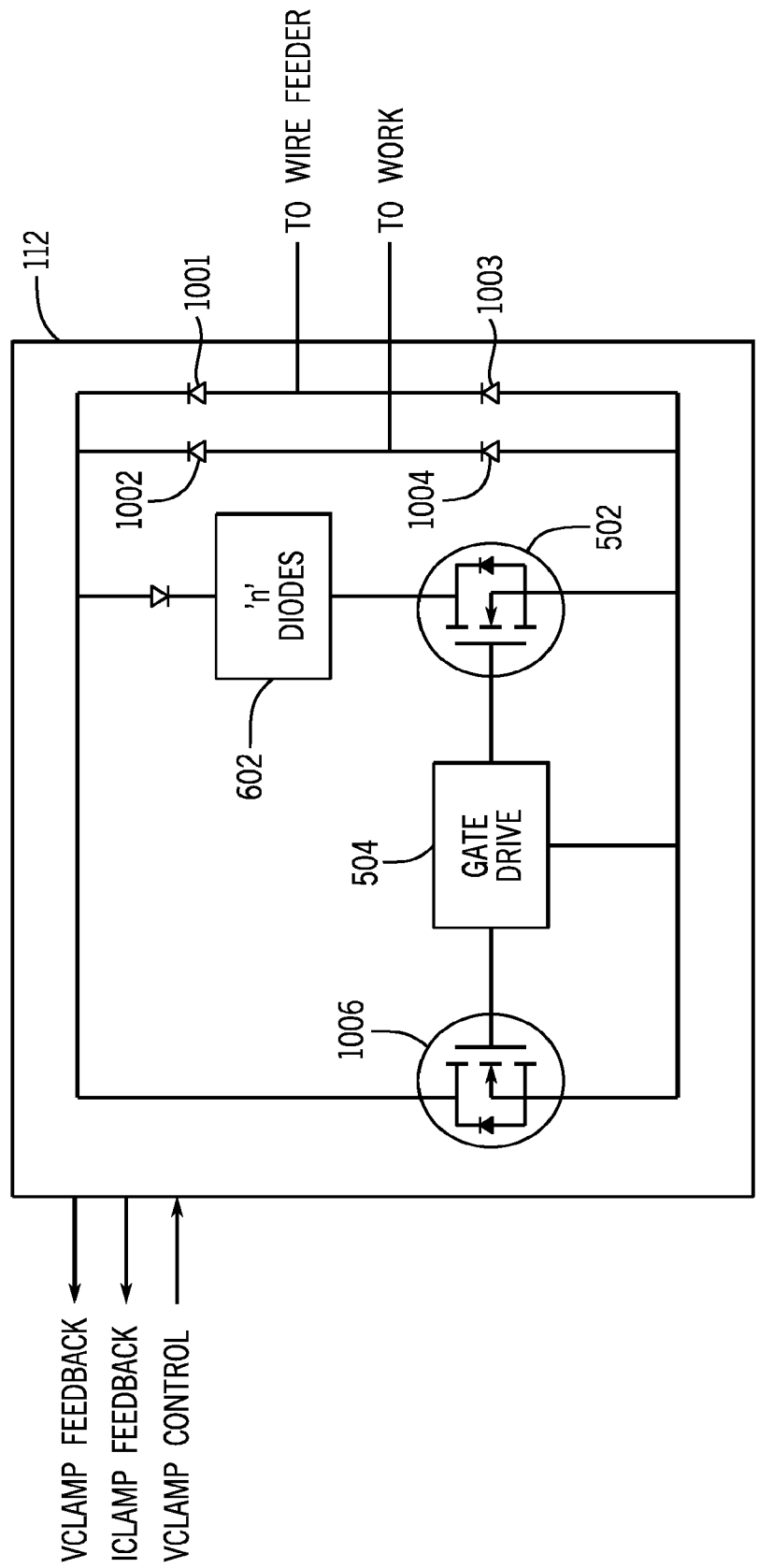
FIG. 10 is a circuit diagram of an arc clamp module.

FIG. 10 is a circuit diagram of an embodiment of arc clamp module 112 similar to FIG. 6, including transistor 502, gate drive circuit 504, clamp (or wire/work) voltage feedback, diode block 602 along with a rectifier comprised of diodes 1001-1004 and a second switch 1006. Operation is similar to the embodiment of FIG. 6, with the addition of diode bridge 1001-1004, which rectifies the signal from the feeder/work. This makes clamp module 112 able to be connected without regard to polarity.

The clamp of FIG. 10 may be used in welding for low spatter short clearing. Initially transistors 502 and 1006 are off during an arc phase in a welding process. Transistor 502 is turned on when a short is detected. The forward voltage drop of diode block 602 is such that no current initially flows because the short circuit is a lower voltage path. As the short begins to separate, voltage increases until the forward drop is reached and transistor 502 and diode block 602 begin to conduct. Current through transistor 502 and diode block 602 is used to detect onset of an arc condition. At this time the transistor 502 is turned off and transistor 1006 is modulated to reduce the current in the arc to a desired level for a desired period of time. When the desired time expires, both transistors are turned off and the process repeats with the arc phase.

Alternatives include a different control scheme, and using the rectifier with other clamp topologies.

When using arc clamp module 112 in a laser cladding applications complete arc suppression should provide less spatter and loss of material. Less spatter will also prolong the life on the laser optics. However, sometimes, small arcs are a benefit to mixing the weld puddle. Arc clamp module 112 can be used to allow arcs at certain times, to reduce spatter when the arc is formed, and to control the frequency of the arcs using controller 116. Spatter controlled areas at a regular frequency can be used to mix the weld puddle in a desired fashion, such that dilution is at a desired level. In such operation arc clamp module 112 prevents arcs from forming most of the time. When a small arc is desired, arc clamp module 112 is controlled to allow the voltage to rise slightly, thus allowing the arc to form. The magnitude to which the voltage is allowed to rise is preferably chosen to provide little spatter. Then, arc clamp module 112 is controlled to limit the voltage, thus ending the arc and returning to the short state. The frequency of the arcs could be user set, factory set, or responsive to the process feedback. The arcs can be at a set frequency, or at varying times.

Figure 11:
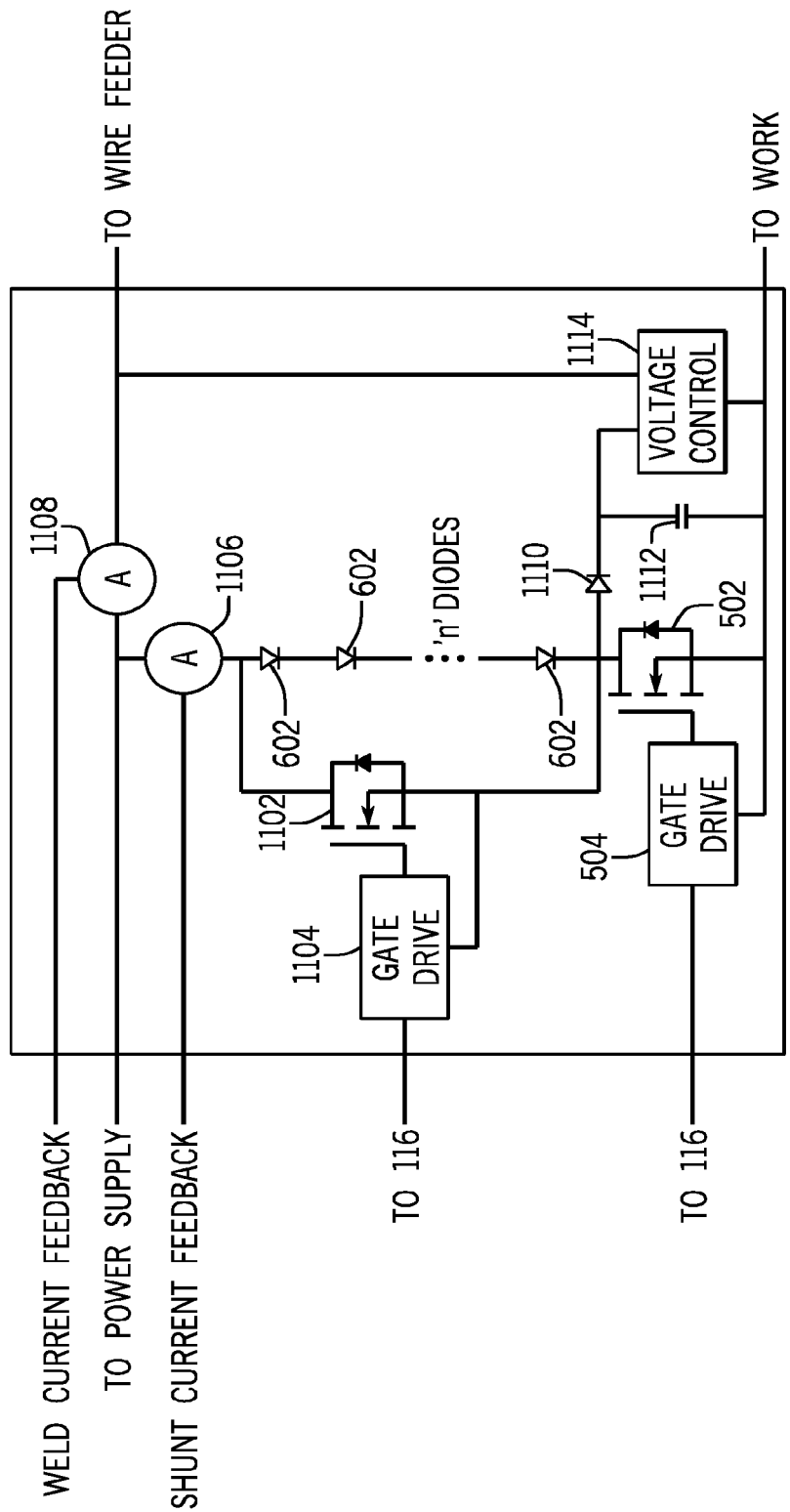

FIG. 11 is a circuit diagram of an embodiment of arc clamp module 112 similar to FIG. 6, including transistor 502, gate drive circuit 504, clamp (or wire/work) voltage feedback, along with a diode block 602. Operation is similar to the embodiment of FIG. 6, and uses closed loop control and gate voltage of transistor 502 to regulate the voltage and current in arc clamp module 112. The clamp voltage drop and total power dissipation is spread across diodes 602 and transistor 502. However, the embodiment of FIG. 11 adds an additional controlled switch 1102 (and gate drive 1104). Switch 1102 is a mosfet in this embodiment, but it could be other types of semiconductor switches. Switch 1104 bypasses the string of "n" diodes 602 so that current can be shunted away from the weld faster by reducing the voltage at the clamp. The rate of current increase in the clamp (the current decrease in the weld) is primarily determined by $V=L \cdot di/dt$ where L is the cable inductance and V is the voltage difference between the weld and the clamp. For a given inductance in the cabling between the clamp and the weld, a higher voltage differential between the weld and the clamp will increase the di/dt in the clamp. A diode 1110, a capacitor 1112, and a voltage control 1114 disposed between diodes 602 and the work, and across switch 502 helps protect switch 502 from overvoltage transients when it turns off. Voltage control 1114 could consist simply of a resistor, a diode, a Zener diode, or it could be an active circuit. A resistor with an appropriate time constant to sufficiently discharge capacitor 1112 to a desired low level before the next clamping event is used in the preferred embodiment. Shunt current feedback sensor 1106 and weld current sensor 1108 are used to provide current feedback as described with respect to other embodiments During an arc phase of the weld process, both switches 502 and 1102 are off, and the capacitor is discharging (or discharged). When the circuit detects that the weld process enters a short, switch 502 is turned on. The voltage across diodes 602 is higher than the voltage of the weld during the short, and little to no current will flow in the clamp during the short. When the short begins to clear, the weld voltage begins to rise, forward biasing the diodes, and drawing current into the clamp circuit. Upon detecting rising voltage or current in (or across) diodes 602, arc clamp module arc clamp control module 116 in controller 103 turns on switch 1102. This reduces the voltage drop in the clamp to just the drop of the two switches, thereby increasing the voltage driving the current up, and thus increasing di/dt in the clamp. Switch 502 can be controlled using pwm to maintain a desired minimum current in the weld to prevent arc outages (when 502 is off, all current goes into the weld, when switch 502 is on, some current is diverted from the weld into the clamp). After a desired amount of time, or until some process parameter is reached, both switches 502 and 1102 turn off, and the cycle starts again.

The embodiment of FIG. 11 is well suited for hot-wire cladding systems and arc welding systems. It provides closed loop control to regulate the clamp voltage, with the ability to adjust the target clamp voltage to the optimum value for a given application. The clamp voltage set point can be adjusted as described above, for example by selecting the number of diodes 602 that are used. The embodiment of FIG. 11 can be used in the way other embodiments described herein are used.

Figure 13:
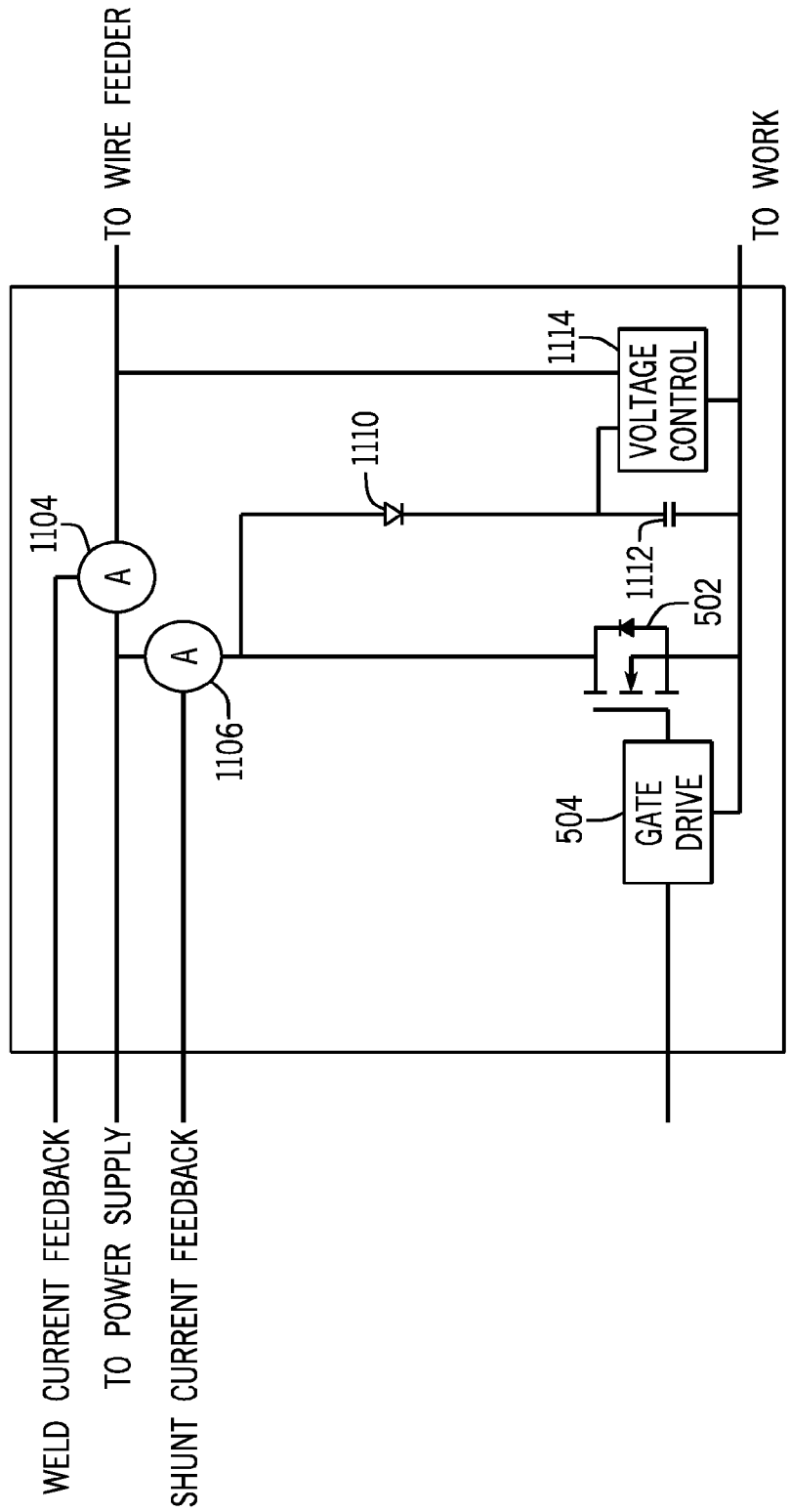

An embodiment shown in FIG. 13 is similar to FIG. 11, but without diodes 602, switch 1102 and gate drive 1104. Instead of using the forward voltage drop of diodes 602 to set the voltage for the initial clamping, diode 1110 and capacitor 1112 are used. The voltage on capacitor 1112 can be actively controlled by voltage control 1114 to set the initial clamping level. This provides more flexibility for setting the initial clamping voltage than diodes 602 provided, and the initial clamping voltage is infinitely adjustable. The voltage may be set and controlled dynamically with software without having to change any hardware.

During the arc phase of the process, switch 502 is turned off, and the voltage on capacitor 1112 drops to a level near the arc voltage. When the circuit detects that the weld process is in a short, the capacitor voltage may be further reduced to the desired clamping level. This can be done by dissipating energy from the capacitor, or potentially returning it to the weld process. Once the short begins clearing, the voltage begins to rise, forward biasing diode 1110, drawing current into the clamp circuit and charging capacitor 1112. Upon detecting the rising voltage or current in the clamp, arc clamp module arc clamp control module 116 in controller 103 turns on switch 502. This provides an alternate current path (with respect to the current path of diode 1110 and capacitor 1112) with a lower voltage drop, thereby increasing the di/dt into the clamp. Switch 502 can be PWMed to maintain a desired minimum current in the weld to prevent arc outages. After a desired amount of time, or until some process parameter is reached, the switch turns off, and the cycle starts again.

Figure 12:
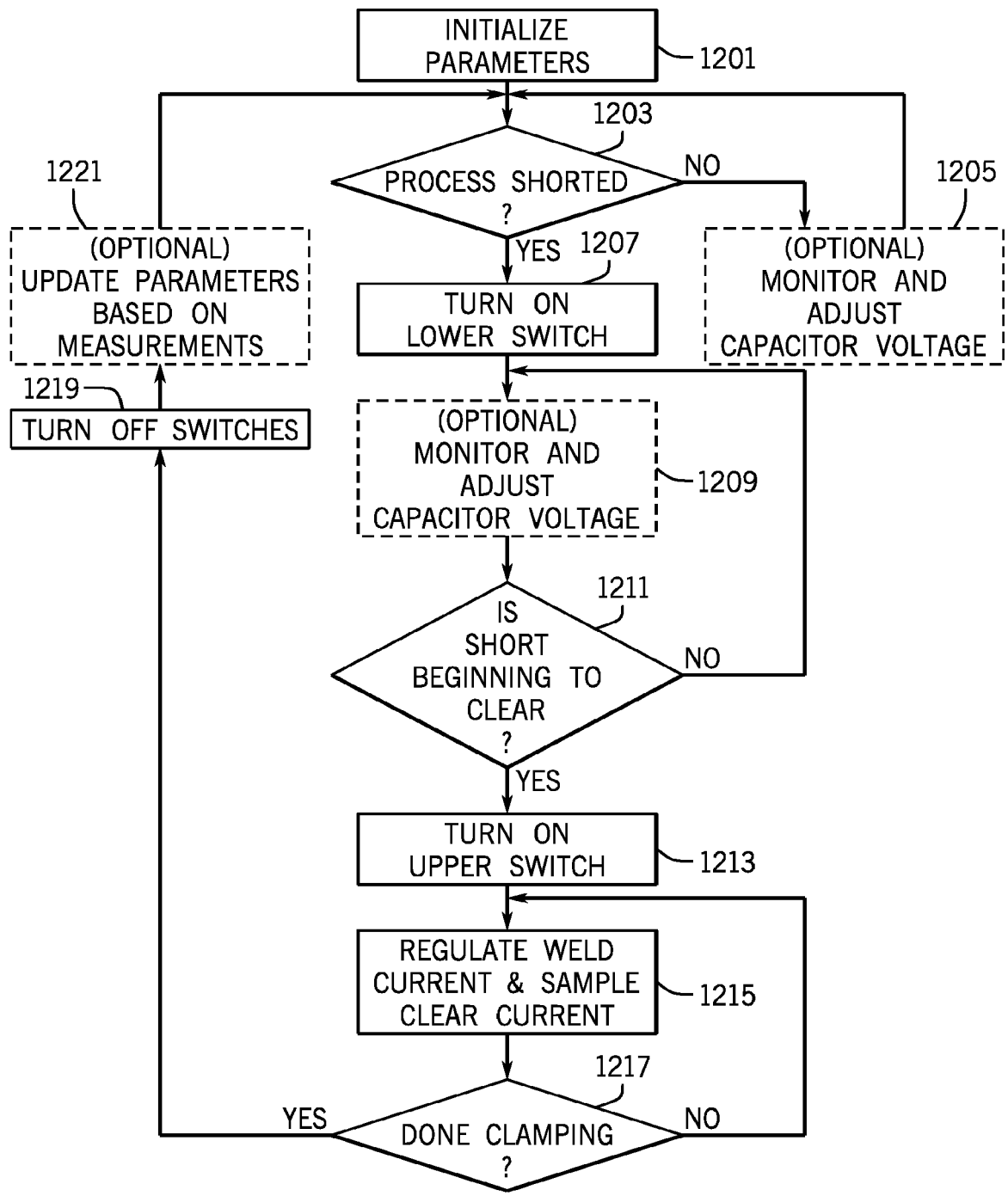
Figure 14:
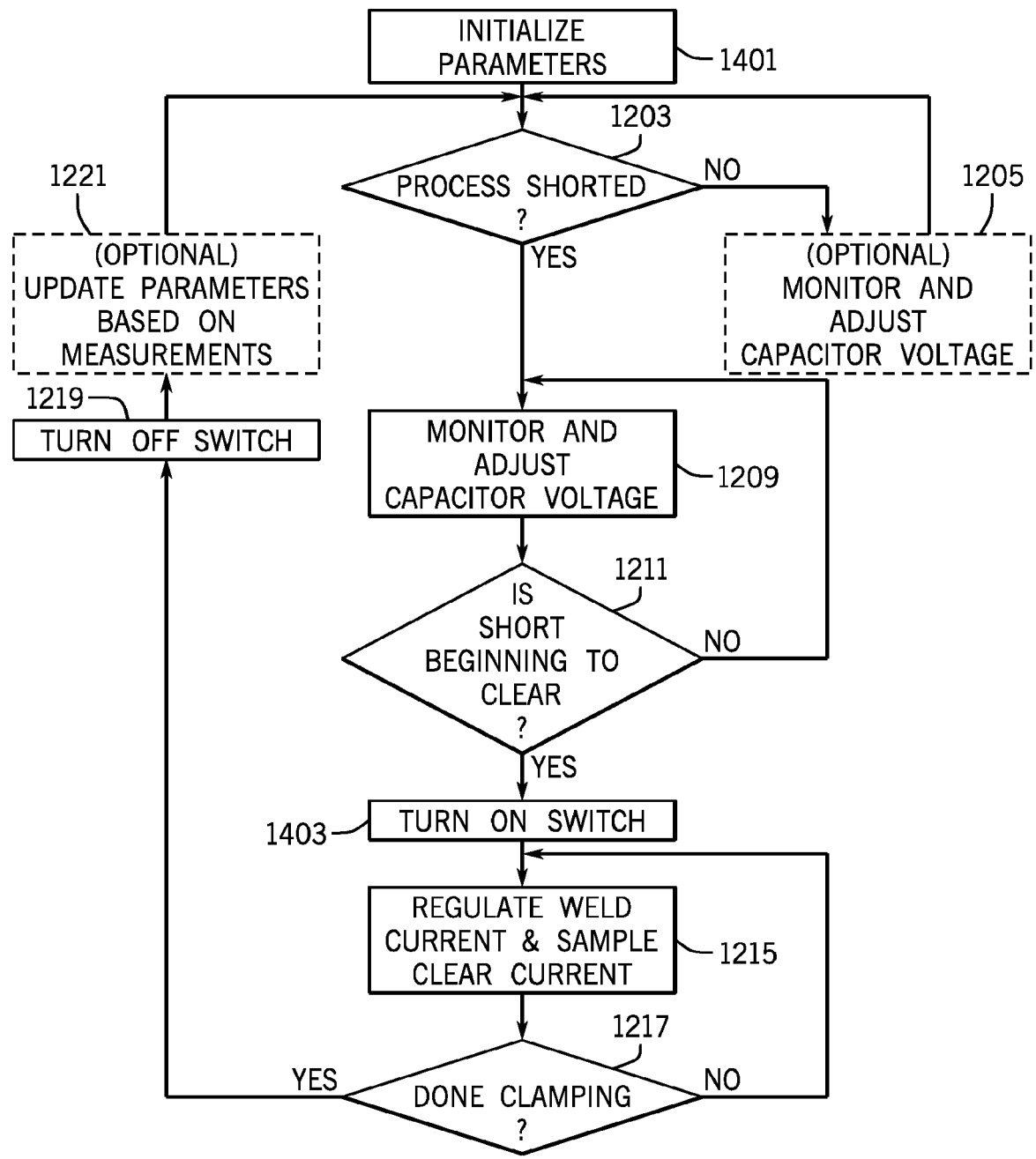

FIGS. 12 and 14 illustrate an embodiment of arc clamp module arc clamp control module 116 in controller 103 that controls the switches in the arc clamp. FIG. 12 is a flow chart to control the embodiment of FIG. 11. The process begins at step 1201. Then, at decision point 1203 it is determined if the process is in a short. If it is not a short, the process returns to monitor the arc/short state, or monitors and adjusts the voltage on capacitor 1112 in an alternative.

If the process is in a short, switch 502 is turned on at step 1207. Then, an optional step 1209 monitors and adjusts the voltage on capacitor 1112. Next, at decision point 1211, the control monitors for when the short begins to clear. If the short is not beginning to clear the control returns to optional step 1209 (or decision point 1211 if step 1209 is omitted).

If the short is beginning to clear the control proceeds to steps 1213 and 1215 where switch 1102 is turned on and the weld current is regulated and the clearing current is sampled. Next, at decision point 1217 the control monitors whether the clamping is completed. This embodiment relies on a timer or process feedback to end the clamping. If the clamping isn't completed the control returns to step 1215, and if the clamping is completed the control returns to decision point 1203.

FIG. 14 is a flow chart to control the embodiment of FIG. 13. The process begins at step 1401. Then, at decision point 1203 it is determined if the process is in a short. If it is not a short, the process returns to monitor the arc/short state, or monitors and adjusts the voltage on capacitor 1112 in an alternative.

If the process is in a short, step 1209 calls for monitoring and adjusting the voltage on capacitor 1112. Next, at decision point 1211, the control monitors for when the short begins to clear. If the short is not beginning to clear the control returns to step 1209. If the short is beginning to clear the control proceeds to step 1403 and 1215 where switch 502 is turned on and the weld current is regulated and the clearing current is sampled. Next, at decision point 1217 the control monitors whether the clamping is completed. This embodiment relies on a timer or process feedback to end the clamping. If the clamping isn't completed the control returns to step 1215, and if the clamping is completed the control returns to decision point 1203.

The implementations of arc clamp control module 116 shown in FIGS. 12 and 14 are exemplary. There are many alternatives to control the timing of the switches and the voltage on capacitor 1112 to clear the short at a desired current. The physics of the system put limits on how quickly current can be diverted from the weld into the clamp. Therefore, the decision as to when to start clamping should be made with the physical limitations in mind.

The decision of when to start clamping includes, in various embodiments, feedback indicative of current in the clamp circuit, weld process voltage, and/or capacitor voltage. Current in clamp circuit is used by detect when current starts to flow into diodes 602 or capacitor 1112. This could be compared to a threshold a current level that is fixed or process dependent, or di/dt or dp/dt or other functions could be calculated and compared to a threshold. The weld process voltage could be used to set when the short begins to clear because the weld voltage begins rising. The weld process voltage could be compared to a threshold (fixed or process dependent) or dv/dt or other function could be calculated and compared to thresholds. The voltage on capacitor 1112 could be by detecting when the voltage rises in response to current flowing in the clamp. The voltage on capacitor 1112 could be compared to a threshold, or dv/dt or some other function could be calculated and compared to a threshold.

When a feedback parameter is used to control the turning on and off of the clamp switches, the threshold for the measured parameter could be set in a variety of ways. A closed loop control could adjust the thresholds automatically to achieve a the desired result, such as a given clearing current. The control could start with an initial threshold, and measure the clear current at each clearing event. The controller could include a loop such as a PID loop, and adjust the threshold to reduce the error between the desired clear current and the actual clear current. This could be done dynamically throughout the weld so that it could adapt even if the weld is changing.

An alternative has a control loop that regulates based on the clamping time before the clearing event. For example, the loop could control such that the weld current tends to a target value 50 usec before the clearing is detected. The control loop varies the threshold to achieve that target. Other alternatives include the welding power supply providing thresholds based on process parameters or pretested values, and/or an operator setting one or more of these parameters, and making adjustments as necessary.

The embodiments of FIGS. 12 and 14 use process feedback or communication with the welding power supply to initiate clamping a given time after entering the short. The time can be processed based, empirically determined, user set, etc. Another alternative uses a model to predict when the short is about to clear, and begin clamping at that time. This does not initially seem ideal because it does not account for process variability easily.

The performance of the clamp and the behavior of the weld can be affected by the amount of current left in the weld (desired clear current), and the duration of the clamping. Reducing the current in the weld below a certain point (dependent on material, wire, wire feed speed, gas, etc.), can produce arc outages and other undesired behavior. Thus, the desired clear current should be as low as desired without causing excess negative side effects.

Also, the current in the weld is preferably lowered to the desired clear current before the short clears. However, clamping too early before the clearing event may remove too much power from the weld, and increase the dissipation in the clamp circuit. Therefore, one alternative begins the clamping as close to the clearing event as possible, while still being able to reduce the current to the set point before the clear. After the clearing event, the clamp is preferably turned off, otherwise the arc could be extinguished. However, turning the clamp off too soon could increase spatter. Therefore, an appropriate amount of post-clearing clamp time needs to be established. The controls discussed here could be analog or digital, or a combination thereof.

Another application of the clamp is in a pulse process to rapidly reduce current at the start of a short, whether the short is intentionally part of the process or inadvertent. Rapidly reducing current at the start of the short helps the process quickly return to the background current.

Yet another application is using the clamp to snub the voltage spike on a rogue cathode (also called an anomalous cathode). A rogue cathode adversely affects process, and snubbing the voltage helps the process perform better.

Numerous modifications may be made to the present disclosure which still fall within the intended scope hereof. Thus, it should be apparent that there has been provided a method and apparatus for controlling an arc between a wire and a work piece that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A welding-type system to output welding-type power, comprising:
  a power circuit configured to output welding-type power to a first electrode and a second electrode via a working current path between the first electrode and the second electrode, the working current path configured to conduct the welding-type power; and
  a bypass path for the welding-type power, wherein:
    the bypass path comprises a plurality of diodes,
    a first diode of the plurality of diodes comprises a first voltage drop and a second diode of the plurality of diodes comprises a second voltage drop, and
    upon a voltage of the working current path exceeding a voltage threshold, the bypass path conducts the welding-type power in parallel with the working current path.

2. The apparatus of claim 1, further comprising:
  a feedback circuit configured to provide feedback from the working current path, the feedback indicating the voltage of the working current path; and
  control circuitry configured to receive the feedback and, upon determining that the voltage of the working current path has exceeded the voltage threshold, control the bypass path to conduct the welding-type power in response to the feedback from the working current.

3. The apparatus of claim 2, wherein the feedback is responsive to at least one of a current in the working current path or the voltage of the working current path.

4. The apparatus of claim 1, wherein the bypass path is a passive clamping circuit configured to conduct the welding-type power if the voltage of the working current path exceeds the voltage threshold.

5. The apparatus of claim 1, wherein the bypass path is configured to prevent an arc from forming between the first electrode and the second electrode.

6. The apparatus of claim 1, wherein the bypass path is a transient voltage suppression circuit configured to conduct the welding-type power based on the voltage of the working current path exceeding the voltage threshold.

7. The apparatus of claim 1, wherein the bypass path is configured to limit the voltage in the working current path to less than or equal to the voltage threshold.

8. The apparatus of claim 1, wherein:
  the first diode and the second diode are connected in a series, the series defining a total forward voltage drop;
  the voltage threshold is the total forward voltage drop; and
  the first diode and the second diode begin to passively conduct the welding-type power automatically and in parallel with the working current path upon the voltage of the working current path exceeding the total forward voltage drop.

9. The apparatus of claim 1, wherein the bypass path comprises a switch configured to connect the first diode to the bypass path.

* * * * *